United States Patent [19]

Davies et al.

[11] Patent Number: 5,524,510

[45] Date of Patent: Jun. 11, 1996

[54] METHOD AND APPARATUS FOR MANUFACTURING A ROCK BIT LEG

[75] Inventors: Peter M. Davies, The Woodlands, Tex.; Dennis D. Bond, Ponca City, Okla.

[73] Assignee: Smith International, Inc., Houston, Tex.

[21] Appl. No.: 321,940

[22] Filed: Oct. 12, 1994

[51] Int. Cl.$^6$ .................................................. B21K 5/02
[52] U.S. Cl. ........................................ 76/108.2; 175/375
[58] Field of Search ................................ 76/101.1, 108.1, 76/108.2, 108.4; 175/375, 366, 412, 413, 435

[56] References Cited

U.S. PATENT DOCUMENTS 5,201,795  4/1993  Howard et al. .................... 76/108.2

Primary Examiner—Douglas D. Watts
Attorney, Agent, or Firm—Robert G. Upton

[57] ABSTRACT

A method of manufacturing a rock bit leg from a rough bit leg forging is disclosed whereby multiple machining operations are performed by a six-axis CNC machining center. Three dimensional datum surfaces are initially formed on a rough leg forging. The rough leg forging is then mounted in a holding fixture. The fixture, including the leg forging, is secured to the six-axis CNC machining center. A three dimensional datum reference from the leg forging is set into the NC function of the six-axis machining center.

The rough leg forging includes a pair of extended flanges coincident with the 120° leg surfaces. The leg flanges mount to complimentary surfaces formed on the leg holding fixture, thus securing the leg within the fixture without interference of any of the machining processes.

The CNC machining center performs a majority of the material removal operations to prepare the leg for subsequent assembly through manipulation of the six interactive axes of the CNC machining center. The machining center positions the rough forging of the rock bit leg in any and all attitudes necessary to accomplish each of the separate material removal operations thereby maintaining extremely close tolerances since the leg forging remains indexed to and secured within the fixture throughout all of the machining processes.

7 Claims, 4 Drawing Sheets

FIG. 3
FIG. 4
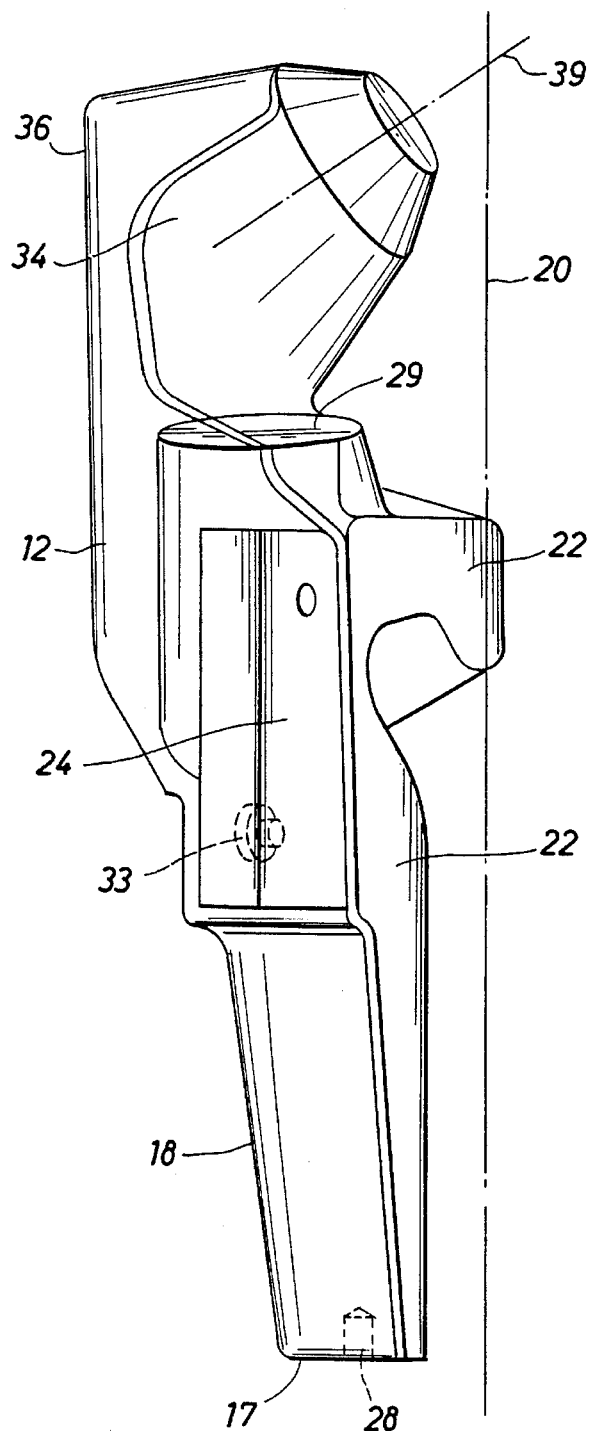
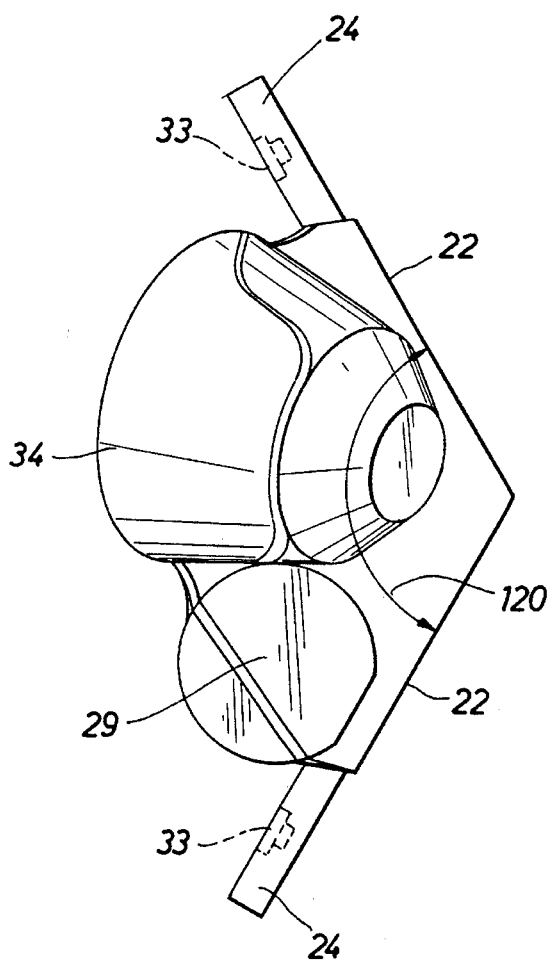

METHOD AND APPARATUS FOR MANUFACTURING A ROCK BIT LEG

I. FIELD OF THE INVENTION

This invention relates to a method of forming a leg for a roller cutter drill bit, and more particularly to a method of doing most of the necessary machining of a drill bit leg using but one mounting fixture set up twice on the same multi-axis CNC machining center.

II. BACKGROUND OF THE INVENTION

A roller cutter drill bit is normally formed of three elongated 120° steel sections or legs having essentially the same geometry. The legs are welded together to form a completed drill bit body. A roller cone is rotatably attached to a cantilevered journal formed at the lower end of each leg to complete the drill bit. Heretofore, it has been common practice to use up to eight different machines, eight special holding fixtures and eight set-ups to do all the machining processes to complete one drill bit leg. When using many different machines and set-ups, the reference datum changes with each operation making it extremely difficult and costly to hold cumulative machining tolerances to acceptable limits on a completed bit leg. The following is a typical description of state of the art operations necessary to convert a rough bit leg forging into a finished roller bit leg.

(Operation 1. Commonly termed 120° milling, this step entails clamping the leg forging in a special fixture mounted on a specially constructed milling machine. Flats are then milled 120° apart on the sides of the forging. They are milled so that three legs positioned with the 120° flats abutting form a bit body. On this same set up, identically located dowel holes are formed into the 120° flat surfaces of the leg so that steel dowel pins placed in the holes position the legs to be welded together in a later operation.

Operation 2. Commonly termed back turning, entails clamping the leg forging in a special fixture using the previously milled 120° flats as datum. The forging and fixture are mounted on a specially designed bit leg outside diameter turning machine, such as a modified lathe to turn this outside diameter surface.

Operation 3. This operation consists of rough turning the bit leg bearing journal with the partially machined forging mounted on a special counter balanced fixture in a lathe using the 120° flats as reference datum. The journal is turned leaving stock to be ground to finished specifications in a later operation.

Operation 4. This step involves mounting the partially machined leg forging in a special fixture on a five-axis CNC machining center using the 120° flats and rough turned journal as dual reference datums. The following operations are sequentially performed using one set-up in the machine.

Step 4a. The lubricant reservoir hole is drilled into the upper tapered shoulder of the leg.

Step 4b. The jet nozzle hole is drilled into the nozzle socket boss on the lower portion of the leg adjacent the bearing journal.

Step 4c. The hole for inserting ball bearings to rotatively affix the roller cutter to the journal is drilled through the lower end of the leg into the ball race on the journal.

Step 4d. The long lubricant hole is drilled from the grease reservoir into the ball insertion hole to supply the bearing with lubricant from the lubricant reservoir.

Step 4e. The lower end of the turned O.D. or shirttail is milled off concentric to the seal backface surface.

Step 4f. The side lubricant pilot hole for the reservoir grease filling operation is drilled adjacent the lubrication reservoir and intersecting the long lube hole of step 4d.

Step 4g. Lubrication retention flats are milled on the journal.

Step 4h. Lubrication access holes are drilled through the journal flat surfaces to intersect the ball insertion hole.

Operation 5. This operation entails hard facing the load side of the journal bearing in the welding station. It may be done manually or by a special robot.

Operation 6. This operation is a manual operation in the weld shop. It entails hard facing of the turned outer surface of the leg, filling dowel holes and reservoir slots.

Operation 7. This operation entails heat treatment of the entire leg.

Operation 8. This operation is rough grinding of the journal using a plunge grinder with the journal bearing ball race as reference datum in a special holding fixture.

Operation 9. This operation is finish grinding the journal using a bucket grinder with the rough ground journal bearing ball race surface used for reference datum.

Operation 10. The operation entails re-milling of the 120° flat surfaces using the finish ground journal ball race surface as reference datum using a special fixture on a 120° mill. The 120° surface must be re-milled because they become distorted during heat treatment of the leg.

Operation 11. This operation entails mounting the bit leg in a special fixture on a 4-axis CNC machining center using both the re-milled 120° surfaces and the ball race of the finish ground journal as dual reference datums. The following operations are sequentially performed using one set-up in the machine.

Step 11a. The side lubrication hole (reference Operation 4- Step 4f) is drilled, counter-drilled and tapped.

Step 11b. The shale burn plug hole, located on the journal back face, is drilled, counter drilled and milled.

Step 11c. The pin end is milled off to a critical length and a small reference dowel hole is drilled in the pin end face.

Step 11d. For subsequent bit assembly means, a shallow tapered hole (dimple) is drilled into the leg back face surface.

As is shown, using this many machines, fixtures and set-ups makes holding the necessary tight dimensional tolerances very difficult as the reference datum on the leg shifts with each set-up. This mandates much closer than normal dimensional tolerances on each metal removal operation, making the overall manufacturing time and cost of a individual bit leg inordinately great. This also leads to an undue level of re-work parts or scrap.

Another disadvantage of current manufacturing systems is when any change is made to a bit leg design, for example, a change in the vertical journal angle or the radial off-set of the journal, a new costly set of machining fixtures must be made to accommodate the change.

The present invention overcomes the shortcomings of the current manufacturing of drill bit legs by providing a method of making a bit leg that is extremely more accurate and versatile. Whereas current methods entail using a multitude of different machines, fixtures and set-ups to machine a bit leg, this invention teaches a method to completely machine a bit leg from a forging using only two machines, two holding fixtures and three set-ups of the workpiece. Because the same reference datum is used for all but the first machining operation, the cumulative error is very slight enabling very close dimensional tolerances on the finished leg to be maintained. Because bit legs made by the teachings of this patent require so few machines and set-ups, as compared to present methods, great savings of time and costs are realized. Because the present invention system is so versatile, it is now feasible, from a cost stand point, to accept rush orders for the manufacture of minimal quantifies of standard bits to fill a customer's need.

SUMMARY OF THE INVENTION

The present invention is directed to an improved method for forming a leg for a roller cone rock bit.

More specifically, it is an object of this invention to provide a superior method whereby the entire machining process of forming a finished bit leg from a rough forging is accomplished by using just one 3-axis and one 6-axis machining centers.

It is another object of the present invention to provide a process for forming a roller cone rock bit leg from a rough forging that will consistently produce finished parts that are significantly more accurate than those currently made.

It is still another object of the present inventions to provide a system for forming a rock bit leg from a rough forging whereby changes in design criteria can be implemented without the need for additional jigs or fixtures.

It is yet another object of the present invention to provide a novel fixture to be mounted on a CNC machining center having at least six interactive axes that will position a rough forging of a rock bit leg in any attitude necessary to perform 16 of 17 material removal operations presently needed to complete a finished roller bit leg.

It is again another object of the present invention to provide a forging for a roller bit leg that has two novel flanges or wings protruding proximate and parallel to the two flat surfaces of the forging that intersect at an angle of 120°. These flanges provide clamping means outside the leg machining envelope whereby the leg forging can be manipulated by CNC into all of the necessary attitudes for forming the leg without having interference between the machine, cutting tool, holding fixture and the workpiece. The aforesaid flanges are removed by grinding or other means prior to assembly of the bit.

A method of manufacturing a rock bit leg from a rough bit leg forging is disclosed whereby multiple machining operations are performed by a six-axis CNC machining center. Three dimensional datum surfaces are initially formed on a rough leg forging. The rough leg forging is then mounted in a holding fixture. The fixture, including the leg forging, is secured to the six-axis CNC machining center. A three dimensional datum reference from the leg forging is set into the NC function of the six-axis machining center.

The rough leg forging includes a pair of extended flanges coincident with the 120° leg surfaces. The leg flanges mount to complimentary surfaces formed on the leg holding fixture, thus securing the leg within the fixture without interference of any of the machining processes.

The CNC machining center performs a majority of the material removal operations to prepare the leg for subsequent assembly through manipulation of the six interactive axes of the CNC machining center. The machining center positions the rough forging of the rock bit leg in any and all attitudes necessary to accomplish each of the separate material removal operations thereby maintaining extremely close tolerances since the leg forging remains indexed to and secured within the fixture throughout all of the machining processes.

The above noted objects and advantages of the present invention will be more fully understood upon a study of the following description in conjunction with the detailed drawings.

BRIEF DESCRIPTION OF THE DRAWINGS

FIG. 3 is a diagrammatic side view of a roller cone bit leg forging.

FIG. 4 is section 4—4 of FIG. 3 showing a rough leg forging with projecting clamping flanges.

DESCRIPTION OF THE PREFERRED EMBODIMENTS AND BEST MODE FOR CARRYING OUT THE INVENTION

Figure 1:
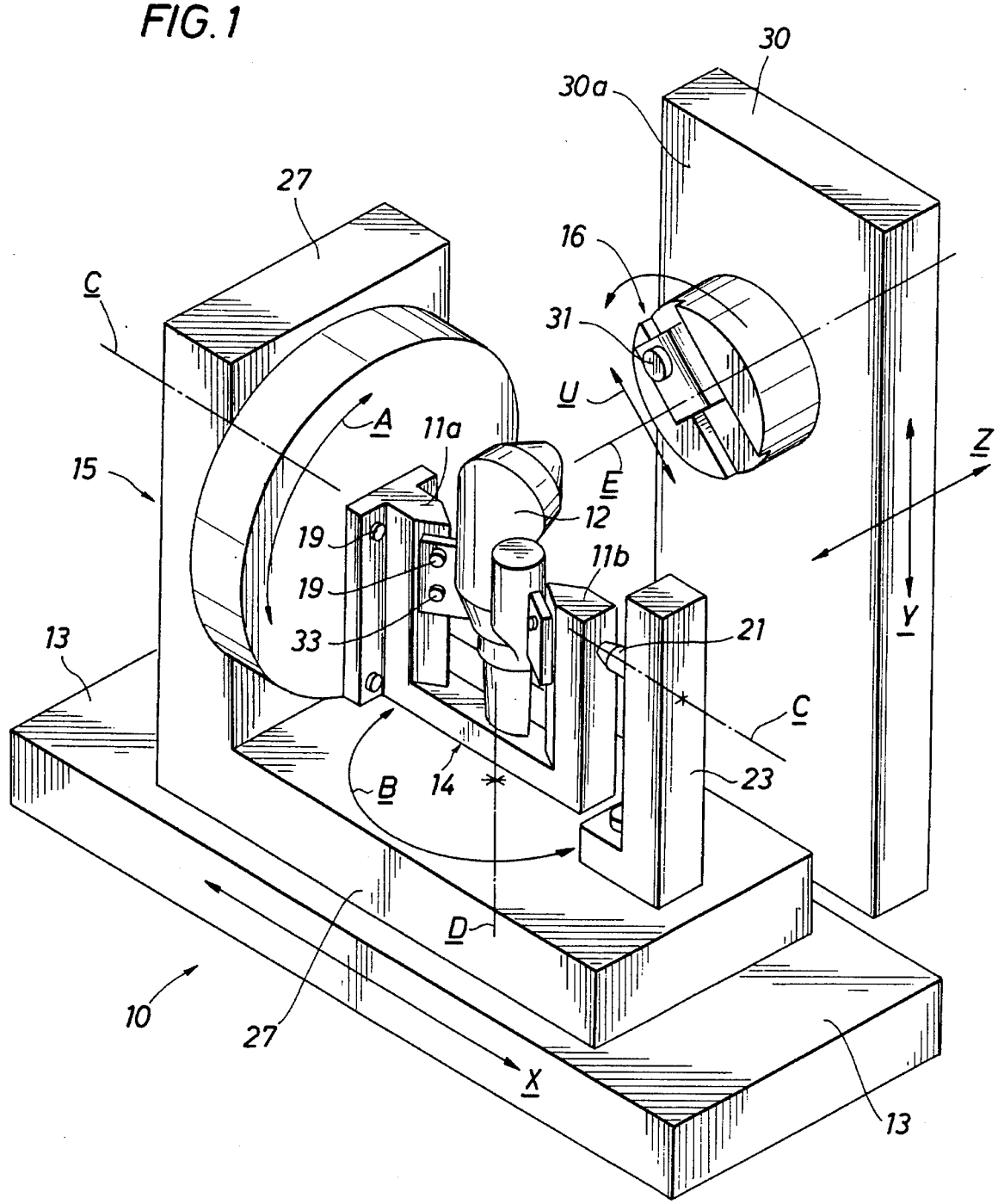
FIG. 1 is a partial diagrammatic perspective view of a 6-axis CNC machining center having a unique workpiece holding fixture mounted thereon. A roller cone bit leg forging is shown clamped in the fixture by means of flanges extending from the leg forging.

Turning now to FIG. 1, the multi-axis horizontal machining center generally designed as 10, is so configured that its six CNC interactive axes can be programmed whereby a roller cone bit leg forging 12 can be completely formed on it except for the first minor machining operation. The first operation is done on a common three-axis machining center (not shown). This operation consists of forming reference surfaces 33 in surface 25 (FIGS. 2 and 3) on the clamping flanges 24 of the forging 12. These surfaces 33 are drilled and counterbored into surface 25 to establish X, Y and Z datum on the forging 12 which is necessary for subsequent CNC machining operations on the six-axis machine 10.

To make it possible to do practically all of the machining operations on the leg forging 12 with the six-axis machining center 10, a novel holding and positioning fixture, generally designated as 14, has been developed.

Figure 2:
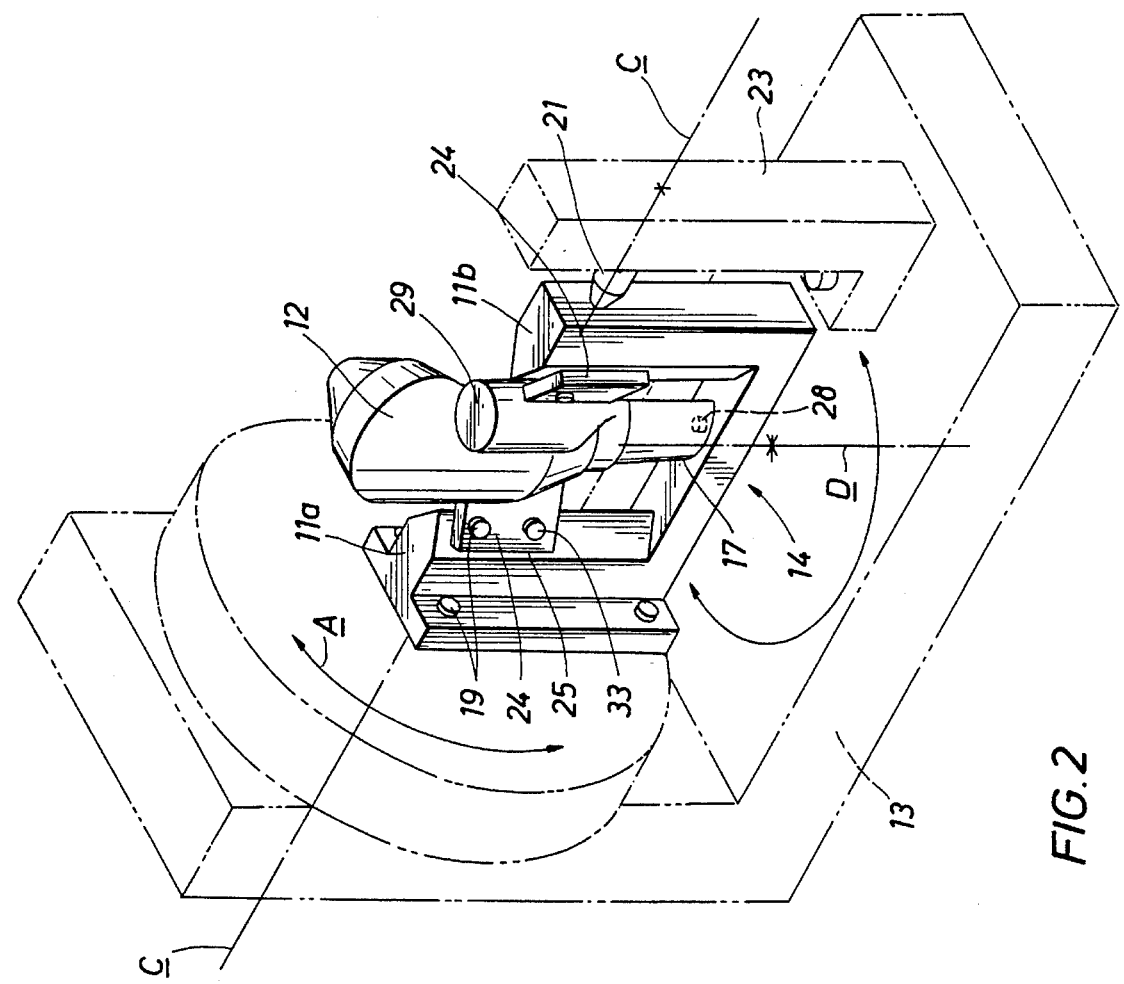
FIG. 2 is an isometric view of a holding fixture with a roller bit leg forging positioned for forming on a 6-axis machining center.

Referring now to FIGS. 1 and 2, which illustrates a bit leg forging 12 positioned and clamped in the novel holding fixture 14. This fixture 14 permits complete CNC manipulation of the leg forging 12 into the many attitudes necessary to machine the complex geometry of the work piece 12 using only one holding fixture 14 mounted on one 6-axis CNC machining center 10. This machining center 10 has a head stock capable of CNC off-center tool rotation U (FIG. 1) for boring/turning operations as well as conventional on-center drilling/milling capabilities.

The following description illustrates the versatility of the novel positioning/holding fixture 14 mounted on a 6-axis CNC machining center 10 having off-center tool rotation U for boring/turning. The holding fixture 14 is essentially a U-frame, one leg 11a of which is mounted by bolts 19, or other clamping means, to rotary table A which is CNC indexable around the horizontal axis C. The opposite leg 11b of fixture 14 has a rotatable support pivot 21, for example a live center, mounted on a vertical support column 23. This rotatable support means 21 has an axis of rotation coincident with horizontal axis C. Support means 21 adds rigidity to the set up and also allows fixture 14 to be CNC rotatively indexed about the horizontal axis C to enable the changing of the vertical angular attitude of the fixture 14.

The flat flanges 24 are preferably forged as integral extensions of the leg forging 12, but may be affixed to the forging 12 by welding or other means. These flanges are formed parallel to the 120° flat surfaces 22 of the forging 12. They are also off-set from the 120° flat surfaces 22 to provide tool clearance when machining the 120° surfaces 22. These flanges 24 are clamped to the 60° flat surfaces 26 formed on the U-frame legs 11 of the holding fixture 14.

The sub-assembly, generally designated as 15, is comprised of a bit leg forging 12 clamped in the holding fixture 14 which is rigidly affixed by bolts 19, or other means, to rotary table A which is CNC rotatively supported on the horizontal C axis by the "L" shaped trunnion 27 (FIG. 1). This sub-assembly 15 is rotatively mounted on turntable B which is CNC indexable around the vertical axis D. This allows CNC horizontal angular attitude changes of the fixture 14 and workpiece 12. Rotary table B is CNC rotatively affixed to horizontal cross-feed table 13. Rotary axis D is perpendicular to both the rotary table B and the linear cross-feed table 13. Table 13 is linearly indexable in the horizontal plane X to allow CNC linear alignment of the workpiece 12 with the various machining tools used in the head-stock, which is generally designated as 16.

The head-stock 16 is rotatively affixed to the vertical column 30. It is CNC rotated on horizontal axis E, which is perpendicular to the front face 30a of column 30 and to the linear sliding axis X of table 13. CNC indexing of the head-stock 16 in the vertical plane Y is made by vertical movement of the column 30. Likewise, CNC indexing of the head-stock 16 in the horizontal plane Z is made by horizontal movement of the column 30. A tool holder 31 is slideably attached to the head-stock 16 which provides means for CNC off-center indexing U of a cutting tool 32 for static turning, boring or facing some surfaces of the bit leg forging 12.

In reference to FIGS. 3 and 4, a side view and top view of the bit leg forging 12 illustrates its overall geometry prior to machining. The upper tapered end 18 will subsequently become part of the threaded connection (not shown).

As discussed heretofore, state of the art systems for machining bit leg forgings entails milling of the 120° flat surfaces on the forging as the first operation. This provides temporary X, Y, Z datum means on the forging for the pre-heat treatment machining operations. However, heat treatment of the partially machined forging seriously distorts it so the 120° flat surfaces must be subsequently re-machined.

The present invention obviates this distortion problem. The extended flanges 24 formed integral to the leg forging 12 are oriented and clamped in the holding fixture 14 using datum surfaces 33 heretofore described. This datum 33 provides the height/depth/width reference surfaces necessary to establish datum of the forging 12 in the CNC function of the machining center 10.

Heat treatment distortion of the leg is of no consequence because the 120° milling step is one of the last machining operation on the six axis machine.

Figure 5:
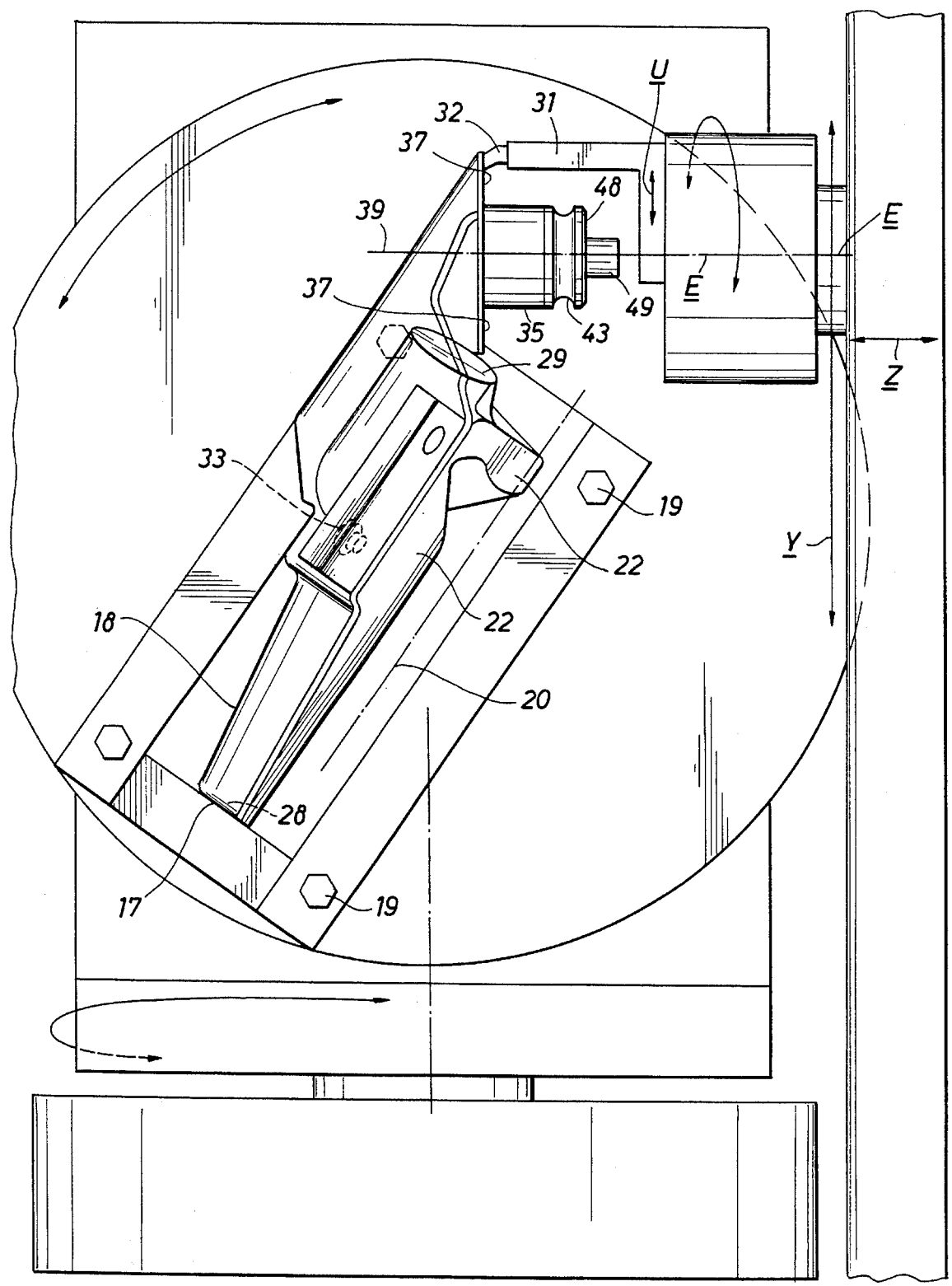
FIG. 5 is a partial side view of a bit leg forging positioned in a fixture mounted on a machining center.

Referring now to FIG. 5, which illustrates a cutting tool 32 affixed in a tool holder U. Tool holder U is rotatably mounted on headstock 16 of machining center 10. The tool holder U can be CNC radially indexed off-center so that the cutting tool 32 describes a circular orbit about the axis E of headstock 16. With the leg forging 12 mounted in the holding fixture 14 so that the center line 39 of journal 35 is coincident with axis E, all of the necessary turning and facing of the bearing journal 35 (FIG. 6) may be completed with the work piece 12 held stationary. The particular cutting tool 32 illustrated is facing the journal backface 37. The depth of horizontal or axial cut on the backface 37 is CNC indexed by the linear column movement Z. The diametral positioning of the cutting tool 32 necessary to form all of the surfaces on the journal 31 is done by the CNC controlled tool off-center function U of the head stock 16.

Figure 6:
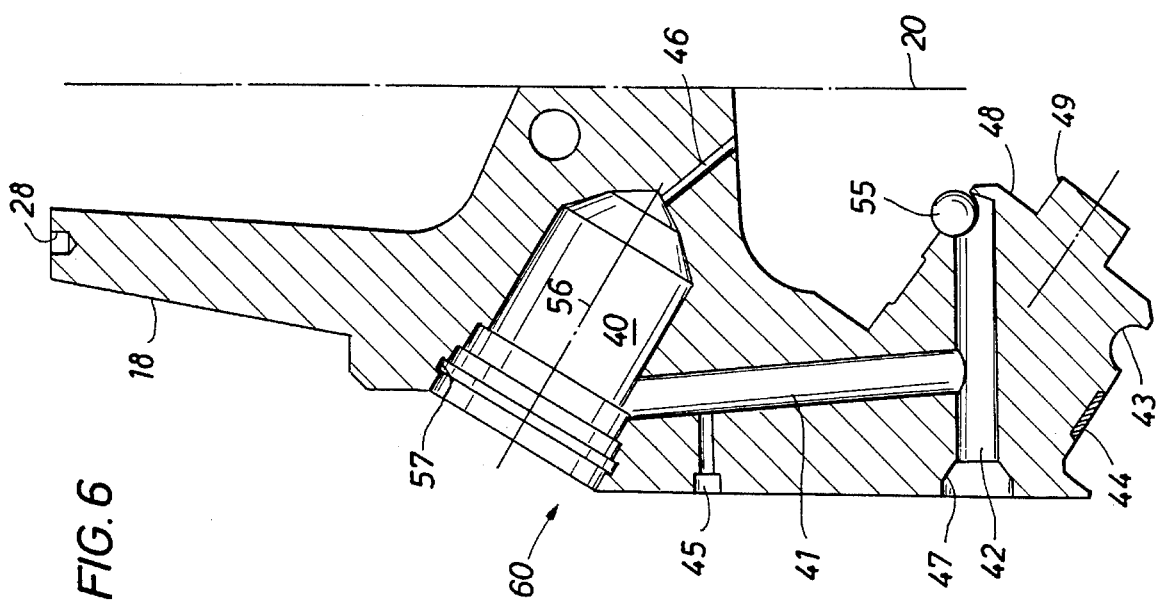
FIG. 6 is a cross-section of a finished leg prior to bit assembly illustrating 16 of 17 machining steps performed on the six axis machine.

FIG. 6, a cross-section of a finished bit leg 38 prior to bit assembly, illustrates many of the geometric features formed on the leg forging 12 by the 6-axis machining center.

The upper conical surface 18, when mated with two more legs 38, will be machined into a tapered connector thread (not shown). Dowel hole 28 is used to axially position the legs 38 for welding. The pin end 17 is machined for a reference surface. The shallow small diameter hole 28 drilled into pin end surface 17 is used for positioning the leg forging 12 in fixture 14. When three finished legs 38 are welded together to form a bit (not shown), the inside, as forged surfaces 51, form a drilling fluid plenum to supply high pressure coolant to the bit cutting structure (not shown).

A bearing journal, generally designated as 35 is cantilevered down and inward from leg 38. A roller cone (not shown) is rotatably mounted on journal 35 by means of ball bearings 55 inserted into the half ball race 43 of the journal 35 and a matching half race (not shown) formed in the bore of the roller cone. The ball bearings 55 are fed into the ball race 43 through the ball insert hole 42 and secured in place by a ball retainer plug (not shown) then welding up the hole 42 and counterbore 47.

On the load side of circumferential groove 53 around the friction bearing surface 54 an anti-galling metal inlay 44 is deposited and turned true in a later operation.

Surfaces 48 and 52 are thrust bearing surfaces that mate with matching faces in the cutter (not shown).

Lubricant is supplied to the journal bearing 35 from a grease reservoir 40 through the long lube hole 41. The grease is forced into the reservoir 40 through the side lube hole 45. The bearing system 35 is pressure compensated by means of a pressure relief valve 46 in the inner leg surface.

The following schedule shows the equipment numbers, types and operations necessary to completely form a bit leg.

Equipment 1. 3-axis machining center
Operation 1. Establish 3 dimensional datum on forging.
Equipment 2. 6-axis machining center with unique holding fixture.
Operation 2. Turn journal statically
(One Set-Up) Mill backturn
Drill reservoir hole
Drill nozzle hole
Drill long lubrication hole Mill shirttail profile
Drill side lubrication pilot hole
Mill flats on journal
Drill journal lubrication holes
Drill ball hole
Equipment 3. Welding area
Operation 3. Hard face journal
Weld shirttail hardfacing
Fill reservoir slot
Equipment 4. Heat treatment
Operation 4. Heat treat complete leg.
Equipment 5. 6-axis machining center with unique holding fixture
Operation 5. Finish turn journal statically
(One Set-Up) Mill 120° flat surfaces
 Drill, counter bore and thread side lubrication entrance
 Drill, counter bore and mill shale burn hole
 Drill positioning dimple hole
 Mill and drill pin end Extremely good and repeatable accuracy of a finished bit leg 38 is achieved by the use of the six-axis machining center 10 fitted with the holding fixture 14. The unique holding and CNC positioning capabilities of the fixture 14 gives uninterrupted access to the forging 12 by the necessary tooling for all but the first machining operation. Equally important, is the extremely good accuracy and repeatability of all of the six CNC axes of the machining center 10.

These specifications, routinely achieved by the hereinabove described six axis CNC machining center 10, are shown in the following chart. As is obvious, these tolerances are much closer than those normally acceptable in industry.

| AXIS | TYPE | ACCURACY POSITIONING IN | REPEATABILITY |
|---|---|---|---|
| X-Y-Z | Linear | 0.00024 | 0.00018 |
| U | Linear | 0.00098 | 0.00039 |
| A-B | Rotary | 5 Seconds | ±2 Seconds |

The foregoing schedule defines the preferred sequence of machining operations now made possible by the present invention of using the unique CNC positioning fixture 14 mated with the recently developed 6-axis CNC machining center 10.

It will of course be apparent to those skilled in the art that other reference surfaces may be formed o the forging 12 that can be used to establish 3-dimensional datum for CNC machining. It will also be apparent that the foregoing machining schedule is not necessarily the only order in which the individual steps may be done and still maintain dimensional integrity in the finished bit leg 38.

It will of course be realized that various modifications can be made in the design and operation of the present invention without departing from the spirit thereof. Thus while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. A method of manufacturing a rock bit leg from a rough bit leg forging whereby multiple machining operations are performed by a six-axis CNC machining center comprising the steps of:

forming three dimensional datum surfaces on a rough leg forging, mounting the rough leg forging in a holding fixture, securing the fixture to the six-axis CNC machining center, establishing a three dimensional datum reference from the leg forging into the NC function of the six-axis machining center, and performing a majority of the material removal operations to prepare the leg for subsequent assembly through manipulation of the six interactive axes of the CNC machining center that positions the rough forging of the rock bit leg in any and all attitudes necessary to accomplish each of the separate material removal operations thereby maintaining extremely close tolerances since the leg forging remains indexed to and secured within the fixture throughout all of the machining processes.

2. A method of manufacturing a rock bit leg from a raw leg forging whereby a majority of machining operations are performed by a six-axis CNC machining center comprising the steps of:

forming three dimensional datum on said rough leg forging, mounting the rough leg forging in a fixture, establishing a three dimensional datum reference from the leg forging into the NC function of the six-axis machining center and performing the following material removal operation;

securing the fixture to the six-axis CNC machining center, machining a journal bearing statically, milling a leg backturn surface, drilling a reservoir hole, drilling a nozzle hole, drilling a long lubrication hole, milling a shirttail profile, drilling a side lubrication pilot hole, milling flats on the journal bearing, drilling journal lubrication holes, drilling a ball hole, removing said fixture from said six-axis CNC machining center, hard facing of the journal, hard facing of the shirttail, welding of a reservoir slot, removal of leg from the fixture, heat treating the entire leg, remounting the leg to the fixture, securing said fixture to the six-axis CNC machining center, machine turn said journal to a final finish statically, milling 120° flat surfaces formed by said leg, drill, counter bore and thread a top side lubrication entrance formed by said leg, drill, counter bore and mill a shale burn hole formed by a leg backface, drill and mill the leg pin end, and drill a leg positioning dimple hole in said backturn surface formed on the leg, the majority of the material removal operations are performed by the six-axis CNC machining center thereby reducing to an absolute minimum the possibility of tolerance stack ups resultant from multiple leg set ups thus repeatability, accuracy and maintenance of very close tolerances is routinely achieved.

3. A rock bit leg forging for a three cone rock bit comprising means for mounting said leg forging in a leg machining holding fixture, said means for mounting said leg forging in the leg machining holding fixture is a pair of flanges integral with and protruding from opposite sides of the forging, the flanges being adjacent to and substantially parallel with two flat surfaces formed by the leg forging that intersect at an angle of about 120°, said mounting means facilitates subsequent multiple machining operations to the leg forging without interference from the means for mounting the leg to the fixture or the fixture itself.

4. The invention as set forth in claim 3 wherein a datum reference indicator is formed by the flanges protruding from said forging.

5. The invention as set forth in claim 4 wherein said leg machining holding fixture for mounting said leg forging for subsequent material removal operations comprises;

a U shaped frame forming an angled surface on each vertical arm of the fixture that compliments the 120° surface formed on each flange protruding from said forging, said forging flanges being secured to the angled surfaces formed on each arm after alignment with said datum reference indicator formed by said flanges formed by said leg forging with complimentary datum reference indicators formed by said angled surface on each vertical arm of the fixture, one arm of the fixture mounts to a rotary table the other of said arms is pivoted through an axes of said rotary table to a pivot pin that projects from a support post that is independent of but parallel to the fixture arms, the support post is mounted to a base structure that is perpendicular to and integral with said rotary table, said base structure and rotary table with attached leg machining holding fixture is independently rotatable through an axes through the base structure that is perpendicular to the axes of the rotary table, the machining fixture therefore enables a manipulation of the leg forging through any and all attitudes to accomplish a multitude of material removal operations without interference of the fixture or the leg forging.

6. The invention as set forth in claim 4 wherein said datum reference indicator formed by said flanges is an indexing hole formed in a surface of said flanges that align with indexing datum indicators formed on leg forging mounting surfaces formed by said leg machining holding fixture.

7. The invention as set forth in claim 5 wherein said datum reference indicator formed by said angles surface on each vertical arm is an indexing pin that interfits with said indexing hole formed in said surface of said flanges protruding from said leg forging.

* * * * *